UNITED STATES PATENT OFFICE.

FEODOR BOAS, OF ST. HYACINTHE, CANADA.

ARTIFICIAL STONE.

SPECIFICATION forming part of Letters Patent No. 707,898, dated August 26, 1902.

Application filed August 30, 1901. Serial No. 73,891. (No specimens.)

*To all whom it may concern:*

Be it known that I, FEODOR BOAS, manufacturer, a subject of the King of Great Britain and Ireland, residing at St. Hyacinthe, in the Province of Quebec, Dominion of Canada, have invented certain new and useful Improvements in Artificial Stones, of which the following is a specification.

This invention has reference to artificial stones which are obtained by the action of high or low pressure steam on a mixture of sand with material containing an alkaline earth, and it is distinguished from the processes heretofore in use by employing silicate of magnesia as a chief agent for effecting the solidification of the mixture. Magnesia has already been used as a base for a mortar or wall plaster in admixture with lime only, no sand being used; but in this case the hardening was due to the action of the atmospheric carbonic acid and in no case did the solidification go beyond a certain maximum of hardness, which is not sufficient for artificial stone as such. An entirely different reaction takes place if a mixture of magnesia-bearing material in admixture with sand is immediately subjected to the action of high or low pressure steam, in which case the formation of carbonate of lime, which is the chief agent for the hardening of mortar, is practically avoided, while, on the contrary, a reaction of the silica with the magnesia and other alkaline earths is set up, whereby double silicates of magnesia are immediately formed. It is well known that magnesia combines more readily than lime with silica and that the salts of magnesia, including the silicates, are more readily decomposable than any other salts of alkaline earths, respectively, and it is obvious, therefore, that by making the alkaline earth in the mixture consist chiefly of magnesia the solidifying process, which depends upon mutual decomposition, is greatly shortened. The difference in the action of water upon magnesia over that of water upon lime is also a point of great importance. While moisture is readily absorbed by lime, water under ordinary conditions does not act upon magnesium oxid. By depending upon magnesia compounds for furnishing the alkaline-earth constituent of my composition I therefore avoid the inconveniences inherent upon the use of lime as a basis for building material. Lime, as is well known, can only be used as hydrate and in a state of very fine subdivision in the manufacture of building material and necessitates great care in the slaking process, inasmuch as incomplete slaking or the presence of even traces of unabsorbed moisture in excess will invariably cause fissures and destroy the stone prepared from the mixture, owing to subsequent slaking and heating of unattached particles of lime or by rapid evaporation and increase of volume of the water present in excess. Magnesia, either added as such or formed in an intermediate stage of the treatment of the mixture in view of its different behavior with water, is free from this inconvenience, while its combining capacity with silica is greater than that of lime. On the other hand, dry magnesia compounds will prevent the inconveniences accompanying the action of moisture upon any lime contained in the mixture, and the ready decomposition of the magnesia compounds will in its turn greatly assist the mutual reaction of the silica with the lime, so as to produce a product of superior hardness and resistibility. If silicate of magnesia is used as a component of the mixture, even the coarse particles of it will be so readily attacked by the silica set free by the action of steam that they will be indissolubly united with the remaining mass. It is obvious, therefore, that a great advantage in the manufacture of building materials, bricks, slabs, and the like is obtained by the use of magnesia as the chief base and the subsequent formation of double silicates of magnesia in the steaming process. In case both lime and magnesia are used in the mixture the magnesia will form a double hydrosilicate with the alkaline base of the lime. It is obvious that the reaction will not be prevented by the previous absorption of carbonic acid from the atmosphere by the lime, so that it is not necessary to mix the lime with the other components immediately after slaking; but I may also store the slaked lime without interfering with the valuable properties of the resulting building material. That these valuable properties of the new artificial stone are due to a reaction differing entirely from the well-known formation of lime sandstone as practiced nowadays is evident from the fact that the moldings prepared from this mixture with silicate of magnesia harden more readily and more perfectly and the stone thereby obtained is more durable than that obtained with moldings subjected to the same treatment and consisting of lime and sand only or of a mixture of lime and other silicates. The chief agent which is operative in producing the desired result is silicate of magnesia, which may, for instance, be used in any of the various forms found in nature, such as chrysolith or olivine, serpentine asbestos, (so-called "chrysothile,") hornblende asbestos or serpentine rock or mineral or hornblende rock or mineral. It is obvious that I may also use with advantage mixtures of these minerals and of the respective rocks in which they occur. Besides these the mass contains an excess of sand as an essential component.

Instead of adding silicate of magnesia directly the formation of the silicate may also take place in the stone itself by using in the place of silicate of magnesia burnt magnesite or dry magnesia salts, which will form basic salts upon being subjected to the action of moist heat. Inasmuch as the alkaline reaction of the oxid of magnesia is more marked than that of oxids of other alkaline earths the magnesia will more readily combine with silicic acid, forming double silicates therewith. In the same manner the necessary percentage of magnesia may be added to the mass in form of a mixture of silicate of magnesia with burnt magnesia or magnesia salts. Before molding the mixture of lime, sand, and silicate of magnesia it is not necessary to add water, unless the moisture which the sand usually contains should not be sufficient to impart the necessary plastic consistence to the mass, which is then pressed into moldings in the usual manner and is finally treated with steam at either low or high pressure for the purpose of effecting the setting and hardening. While I am not bound to use certain definite proportions of these several ingredients, but may vary the same to suit existing conditions, I may give the following proportions as an example of carrying my invention into effect: about eighty-eight parts, by weight, of sand, about seven parts, by weight, of silicate of magnesia, and five parts, by weight, of lime. The hardening process is preferably effected at a pressure of about one hundred and twenty pounds to the square inch. The stones which are manufactured from this composition exhibit a very high degree of resistibility against the action of fire and cold. Aside from being of low specific gravity, they show the further advantage of being very poor conductors of sound and heat. By increasing the percentage of silicate of magnesia these advantages may be enhanced to suit the various purposes for which the building material obtained is to be used. All these advantages depend on the readiness of magnesia compounds to be acted upon by various chemical agents, and by silica in particular.

It is obvious that I may also mix coloring agents with the ingredients making up the composition of the artificial building material forming the subject of this invention and I am thereby enabled to produce material of any desired color.

What I claim, and desire to secure by Letters Patent of the United States, is—

1. The process for manufacturing artificial stone which consists in mixing silicate of magnesia of any degree of subdivision with a small amount of lime and a sufficient quantity of water to impart plasticity to the mixture, then dividing the plastic mixture into parts of any desired shape and size, and submitting the same directly to the action of steam.

2. The process of manufacturing artificial stone, which consists in crushing any kind of magnesia rock into any degree of subdivision, mixing the same with sand and a small amount of lime, making moldings therefrom and treating the moldings with steam.

3. In the process of manufacturing artificial stone, treating material containing magnesia in excess by weight of lime with steam, substantially as described.

4. In the process of producing artificial stone, slaking lime and treating the same with steam in presence of an excess of magnesia by weight, as compared with the amount of lime, and in presence of sand, substantially as described.

5. The process for manufacturing artificial stone, which consists in mixing an excess by weight of sand with a small amount of lime, adding magnesia in any form or condition thereto, the magnesia being in excess of lime by weight, and treating the mixture with steam, substantially as described.

6. In the process of manufacturing artificial stone, slaking lime, mixing the same with material containing magnesia as a chief component and in any state or degree of subdivision, adding sand and molding the mixture, substantially as described.

7. As a new article of manufacture, an artificial stone, containing silicates of magnesia and lime, the magnesia being in excess of lime by weight, substantially as described.

8. A composition of matter, comprising sand, largely in excess by weight, silicate of magnesia and silicate of lime, the magnesia being in excess of lime by weight, substantially as described.

In witness whereof I have hereunto signed my name in the presence of two subscribing witnesses.

FEODOR BOAS.

Witnesses:
 W. PAQUNETO,
 F. BARBEL.